June 14, 1938. M. PARISI 2,120,527
INCANDESCENT NERNST LAMP
Filed Oct. 1, 1936
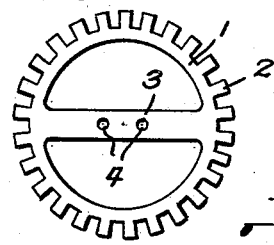
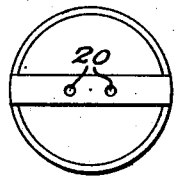
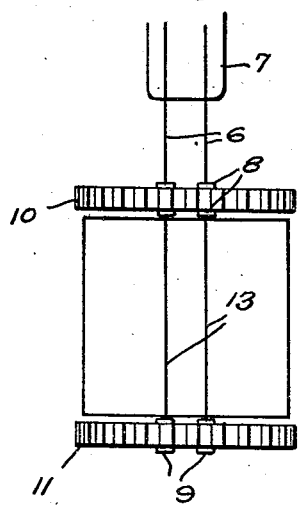
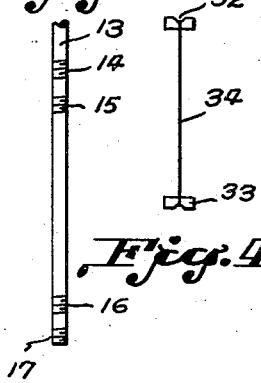
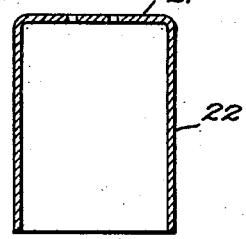
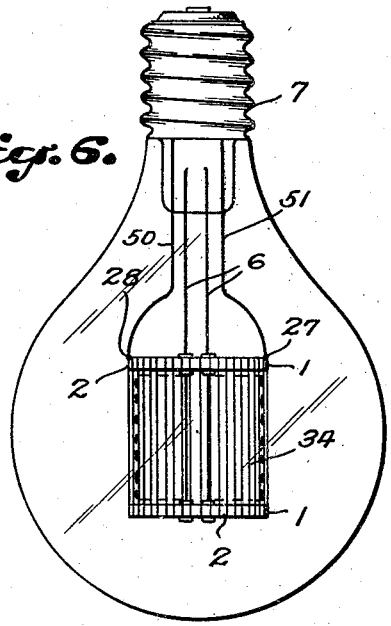
MICHAEL PARISI
INVENTOR
BY Ely Pattison
ATTORNEYS.

Patented June 14, 1938

2,120,527

UNITED STATES PATENT OFFICE 2,120,527

INCANDESCENT NERNST LAMP

Michael Parisi, New York, N. Y., assignor of one-half to Mervin P. Doughty, Lawrence, N. Y.

Application October 1, 1936, Serial No. 103,493

3 Claims. (Cl. 176—17)

This invention relates to new and useful improvements in lighting apparatus and more particularly it pertains to a new and improved incandescent lamp of the Nernst type.

It is the object of the invention to improve the construction and operation of incandescent lamps and particularly to improve the lighting qualities and to lengthen the life thereof.

A feature of the invention resides in the novel combination with an electrical incandescent filament, of a non-electrical incandescent element capable of incandescence in the presence of heat.

A further feature of the invention resides in a new and novel construction and arrangement of parts whereby a rupture of the electrical incandescent filament will not render the lamp totally inoperative for illuminating purposes.

A further feature of the invention resides in a new and novel construction and arrangement of parts whereby a given candle power or volume of light may be obtained with a smaller consumption of power than is possible in incandescent electric lamps as they are generally constructed.

It is a well known fact that the incandescent electric lamp as it is generally constructed, converts a large proportion of the power required for its operation into heat energy instead of radiant energy and it is a further object of this invention to provide a new and novel construction and arrangement of parts whereby this heat energy may be utilized by conversion of an appreciable portion thereof into radiant energy within an incandescent lamp.

Figure 1 is a plan view of one of the filament supporting elements showing the non-electrical incandescent member in position to be secured thereto, Figure 1a is a transverse sectional view thereof, Figure 2 is a sectional view illustrating the entire filament assembly, Figure 3 is a view in elevation on an enlarged scale illustrating a portion of the filament structure, Figure 4 is a schematic view illustrating the manner in which the filament is carried by its supports, Figure 5 is a top plan view of the non-electrical incandescent element, Figure 5a is a longitudinal sectional view thereof, Figure 6 is a view in elevation of an incandescent lamp constructed in accordance with the present invention, Figure 7 is a diagrammatic view of the electrical filament illustrating the manner in which power is supplied thereto, and Figure 7a is a schematic view of a portion of the electric filament.

In carrying out my invention I employ two filament carrying members designated 1 in the drawing. While these members may be made of any desirable shape I prefer to make them circular in form, as illustrated in the drawing. Each of these members is provided on its peripheral edge with a plurality of projections 2 arranged about the peripheral edge in spaced relation to one another. Extending across each of the members 1 there is an arm or bar 3, and said arm or bar 3 is provided with a plurality of openings 4, of which there are preferably two. Passing through these openings 4 there are supporting wires 6 of which there are two shown, the free ends of these supporting wires being anchored in the plug end 7 of the lamp.

These members are adapted to be retained in rigid spaced relation and for this purpose, I employ two rigid bars 13, as shown in enlarged scale in Figure 3, which bars are adapted to be positioned in the openings 4. The bars 13 are formed with threaded portions 14, 15, 16, and 17. The portions 14 and 15 are adapted to have threading engagement with two nuts 8 between which the upper ring-like member 1 is secured, while the threaded portions 17 and 16 of the bars 13 are adapted to receive nuts 9 between which the lower ring-like member 1 is clamped. By this means the two ring-like members 1 are retained in spaced relation and are rigidly supported.

Each of the projections 2 of the upper ring-like member is provided on its upper face with a notch such as 32, while each of the projections 2 on the lower ring-like member 1 is provided on its lower face with a notch such as designated 33 in Figure 4.

The reference numeral 34 designates an electrical filament. This electrical filament consists of a suitable wire-like structure preferably tungsten, and this filament is passed around the projections of the ring-like members, the same lying in the notches 32 of the projections of the upper ring-like member and in the notches 33 of the lower ring-like member. As heretofore stated, this member constitutes the electrical filament and it operates in substantially the same manner as electrical filaments for incandescent electrical lamps in that it becomes incandescent when power is supplied thereto.

Power is supplied to the filament by conductors 50 and 51 and as illustrated in Figure 7, this filament may be divided into a plurality of sections by supplying power at different points thereof. For example, leading from the conductor 50 at the point 25 there is a conductor 36 which is connected as at 26 to the electrical filament, and leading from the conductor 51 at the point 27 there is a conductor 37 connected to the filament as at 28. This construction and arrangement of conductors divides the filament into four sections and it is obvious that in the event that damage or rupture should occur to the filament at any point between its ends, only that section in which the damage occurs will be rendered inoperative, leaving the remaining sections intact to receive power and become incandescent under the influence thereof.

By this construction and arrangement of parts it will be clear that even though one section of the filament may become inoperative from any cause, the entire lamp will not be rendered useless but will in reality, only be reduced in candle power to the extent of the candle power of the damaged section of the filament. Thus it will be apparent that at no time will the lamp be rendered totally inoperative except when damage has occurred to all of the sections of the filament thereof, as distinguished from incandescent electric lamps as they are generally constructed.

Since it is a well known fact that a large proportion of the power supplied to incandescent light is transformed into heat energy, it is obvious that such power as is transformed to heat energy is wasted insofar as illuminating purposes are concerned.

In the present invention I have provided means to transform this heat energy into radiant energy and to this end I provide an element 22. This element 22 is formed from a suitable material capable of obtaining incandescence in the presence of heat of which certain rare earths known as thorium or cerium are good examples.

This element is of cylindrical form and is provided across one of its ends with a bar 21 having openings 20 therein for the reception of the bars 13, heretofore mentioned. This cylindrical element is pre-cast or otherwise formed from the material mentioned and it has relatively thin walls. In the lamp, it is adapted to occupy a position in which it is wholly enclosed in or surrounded by the incandescent filament, as illustrated in Figure 6, and when in operative position it will be in close juxta-position with respect to the electrical filament, but out of contacting engagement therewith.

As heretofore stated, the openings 20 of the cross bar 21 of the element 22 are adapted to receive the bars 13 and the several nuts which clamp the uppermost ring-like member upon these bars will also be employed to clamp the element 22 in a position in which it extends downwardly from beneath the upper ring-like member.

It is to be understood that the ring-like members 1 are formed of any suitable non-conducting material of which lava is one very good example.

In operation, when power is supplied to the filament in sufficient quantity to cause incandescence thereof, the heat generated will effect incandescence of the element 22. The incandescence of the element 22 will provide radiant energy which, when combined with the radiant energy resulting from the incandescence of the electrical filament, will provide radiant energy in sufficient volume and a given candle power may be obtained with less consumption of power by the electrical filament than is necessary to obtain said candle power in incandescent lamps as they are generally constructed.

The filament structure may be incorporated in an electric lamp globe or bulb in any desired manner. I prefer, however, to accomplish this by extending the upper end of the rods 13 into the base or nipple portion of the base of the bulb as indicated in Figure 6, the rods 13 providing the means for supporting the filament structure within the bulb.

From the foregoing it will be obvious that the present invention provides a new and improved form of electric lamp in which any given candle power may be obtained with the consumption of less power than is required to obtain the same candle power in electric lamps as they are generally constructed. Furthermore, the present invention provides an electric lamp in which damage to the electrical filament at any one given point therein will not render the lamp totally inoperative but will merely reduce the candle power thereof.

While the invention has been herein illustrated in its preferred form it is to be understood that it is not to be limited to the specific construction herein disclosed and that it may be practiced in other forms without departing from the spirit thereof.

Having thus described the invention, what is claimed as new, is:

1. A filament structure for incandescent lamps comprising in combination, a pair of circular ring-like members, projections extending from the peripheral edge of each of said ring-like members, means for rigidly supporting said ring-like members in spaced relation, a continuous electrical incandescent element bridging the space between said ring-like members and carried by the projections on the peripheral edges thereof, and an incandescent element of non-conducting material mounted between said ring-like members and wholly within the confines of the space enclosed by the electrical filament.

2. A filament structure for incandescent lamps comprising in combination, a pair of ring-like members, projections extending from the peripheral edge of each of said ring-like members, means for rigidly supporting said ring-like members in spaced relation, a continuous electrical incandescent element bridging the space between said ring-like members and carried by the projections on the peripheral edges thereof, an incandescent element of non-conducting material disposed wholly within the space enclosed by the electrical incandescent element, and means for supporting said element from one of said ring-like members.

3. A filament structure for incandescent lamps comprising in combination, a pair of ring-like members, projections extending from the edges of said ring-like members, means for rigidly supporting said ring-like members in spaced relation, a continuous electrical incandescent element bridging the space between said ring-like members and carried by the projections extending from the edges of the ring-like members, and an incandescent element of non-conducting material arranged wholly within the confines of the space enclosed by the electrical filament and supported from one of the ring-like members, said incandescent element comprising a cylindrical member having relatively thin walls and formed from a material capable of incandescence in the presence of heat.

MICHAEL PARISI.